US010630622B2

(12) United States Patent
Gledhill (10) Patent No.: US 10,630,622 B2
(45) Date of Patent: Apr. 21, 2020

(54) ADDING IMAGES VIA MMS TO A DRAFT DOCUMENT

(71) Applicant: eBay Inc., San Jose, CA (US)

(72) Inventor: Vivian Gledhill, San Jose, CA (US)

(73) Assignee: eBay Inc., San Jose, CA (US)

( * ) Notice: Subject to any disclaimer, the term of this patent is extended or adjusted under 35 U.S.C. 154(b) by 95 days.

(21) Appl. No.: 15/856,357

(22) Filed: Dec. 28, 2017

(65) Prior Publication Data

US 2019/0207883 A1    Jul. 4, 2019

(51) Int. Cl.
*H04L 12/58*    (2006.01)
*H04W 4/12*    (2009.01)

(52) U.S. Cl.
CPC .............. *H04L 51/08* (2013.01); *H04L 51/18* (2013.01); *H04W 4/12* (2013.01); *H04L 51/10* (2013.01)

(58) Field of Classification Search
CPC ......... H04L 51/08; H04L 51/18; H04L 51/10; H04W 4/12; G06Q 30/0601
See application file for complete search history.

(56) References Cited

U.S. PATENT DOCUMENTS

| 7,165,224 | B2 | 1/2007 | Pyhalammi |
| 7,343,168 | B2 | 3/2008 | Valloppillil |
| 8,295,863 | B1 | 10/2012 | Gupta et al. |
| 8,635,124 | B1 * | 1/2014 | Hamilton ........... G06Q 30/0601 705/27.1 |
| 9,332,110 | B2 | 5/2016 | Lim et al. |
| 9,747,622 | B1 * | 8/2017 | Johnson ............. G06Q 30/0601 |
| 10,200,328 | B2 * | 2/2019 | Burlin ..................... H04L 51/22 |
| 2006/0047572 | A1 * | 3/2006 | Moore ................... G06Q 30/00 705/14.64 |
| 2006/0194572 | A1 | 8/2006 | Fresonke et al. |
| 2006/0264209 | A1 | 11/2006 | Atkinson et al. |
| 2007/0130008 | A1 * | 6/2007 | Brown ................... G06Q 30/02 705/14.39 |

(Continued)

FOREIGN PATENT DOCUMENTS

| GB | 2475838 A | 6/2011 |
| WO | 2019/133286 A1 | 7/2019 |

OTHER PUBLICATIONS

International Search Report for PCT Application No. PCT/US2018/065598, dated Mar. 8, 2019, 5 pages.

(Continued)

*Primary Examiner* — Blake J Rubin
(74) *Attorney, Agent, or Firm* — Schwegman Lundberg & Woessner, P.A.

(57) ABSTRACT

A user may use a client device to create a draft document by interacting with a server. The server may send a message to a second device (e.g., using the short message service (SMS)). The message may prompt the user to respond with a message (e.g., a multimedia messaging service (MMS) message) that includes an image to be added to the draft. The server receives the image and modifies the draft (e.g., by updating a web page being displayed on the client device). This process allows the user to type text for a draft using a client device that includes a keyboard (e.g., a desktop or laptop computer) and to add an image to the draft using a second device that includes a camera (e.g., a mobile phone or tablet computer) without having to transfer the image from the second device to the first device.

20 Claims, 9 Drawing Sheets

(56) References Cited

U.S. PATENT DOCUMENTS

| | | | |
|---|---|---|---|
| 2009/0106127 A1* | 4/2009 | Purdy | G06Q 30/0601 |
| | | | 705/26.1 |
| 2010/0114736 A1* | 5/2010 | Lewis | G06Q 30/0601 |
| | | | 705/26.1 |
| 2011/0029547 A1* | 2/2011 | Jeong | G06F 3/0482 |
| | | | 707/758 |
| 2011/0208822 A1* | 8/2011 | Rathod | G06F 16/9535 |
| | | | 709/206 |
| 2013/0254059 A1* | 9/2013 | Teo | G06Q 30/08 |
| | | | 705/26.4 |
| 2014/0136346 A1* | 5/2014 | Teso | G06Q 30/06 |
| | | | 705/14.72 |
| 2015/0235296 A1 | 8/2015 | Hamilton et al. | |
| 2015/0242897 A1* | 8/2015 | Dinardo, Jr. | H04W 12/08 |
| | | | 705/14.56 |
| 2016/0267462 A1 | 9/2016 | Batlle | |
| 2017/0055136 A1* | 2/2017 | Lee | H04W 12/08 |
| 2017/0149708 A1 | 5/2017 | Baumgartner | |
| 2017/0250931 A1* | 8/2017 | Ioannou | H04L 51/02 |
| 2018/0309801 A1* | 10/2018 | Rathod | H04L 51/04 |

OTHER PUBLICATIONS

International Written Opinion received for PCT Application No. PCT/US2018/065598, dated Mar. 8, 2019, 11 pages.

* cited by examiner

| 510 — USER TABLE ||
|---|---|
| USER (520) | MOBILE NUMBER (530) |
| LARRY (540A) | 555-1234 |
| MOE (540B) | 555-2345 |
| JACK (540C) | 555-3456 |

| 550 — DRAFT TABLE ||
|---|---|
| USER (560) | DRAFT ID (570) |
| LARRY (580A) | 1000 |
| MOE (580B) | 1001 |
| JACK (580C) | 1002 |

ADDING IMAGES VIA MMS TO A DRAFT DOCUMENT

TECHNICAL FIELD

The subject matter disclosed herein generally relates to the processing of data. Specifically, in some example embodiments, the present disclosure addresses systems and methods for adding images via a multimedia messaging service (MMS) to a draft.

BRIEF DESCRIPTION OF THE DRAWINGS

Some embodiments are illustrated by way of example and not limitation in the figures of the accompanying drawings.

DETAILED DESCRIPTION

Example methods and systems are directed to adding images (e.g., photos) via MMS to a draft. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A user may create a draft document by interacting with a server. For example, the server may provide a web page that includes text fields that are filled in by the user via a web browser of a client device. Images (e.g., photos) may be uploaded from the client device to the server for inclusion in the draft document. In some cases, images to be included in the draft document are not stored on the client device, but on a second device (e.g., a mobile phone).

The server may send a message to the second device (e.g., using the short message service (SMS)). The message may prompt the user to respond with a message (e.g., a multimedia messaging service (MMS) message) that includes an image to be added to the draft. The server receives the image and modifies the draft (e.g., by updating the web page being displayed on the client device). This process allows the user to type text for a draft using a first device that includes a keyboard (e.g., a desktop or laptop computer) and to add an image to the draft using a second device that includes a camera (e.g., a mobile phone or tablet computer) without having to transfer the image from the second device to the first device.

Historically, transferring images from a mobile device to a desktop computer required connecting the mobile device with a universal serial bus (USB) or other hardwired connection. This process is cumbersome because it requires the user to find the required cable, attach the cable to the two devices, navigate the file structure of the mobile device to find the image, and copy the image to the desktop computer. Alternatively, images could be transferred by first transferring the images to a file or image storage application on the cloud, then transferring the images from the cloud to the desktop computer. This process also requires the user to perform multiple steps: logging into the cloud application from the mobile device, uploading the file, logging into the cloud application from the desktop computer, and downloading the file. With the systems and methods described herein, the user neither requires a hardwired connection nor has to be logged into a cloud account on multiple devices.

Another aspect of the systems and methods described herein is reduced processing and memory storage. In the existing methods of transferring files via a desktop computer, the desktop computer must store the image and use processor cycles in receiving the image from the mobile device and in uploading the image to the server. By transferring the image directly from the mobile device to the server creating the draft document, computing resources of the desktop computer are saved.

Figure 1:
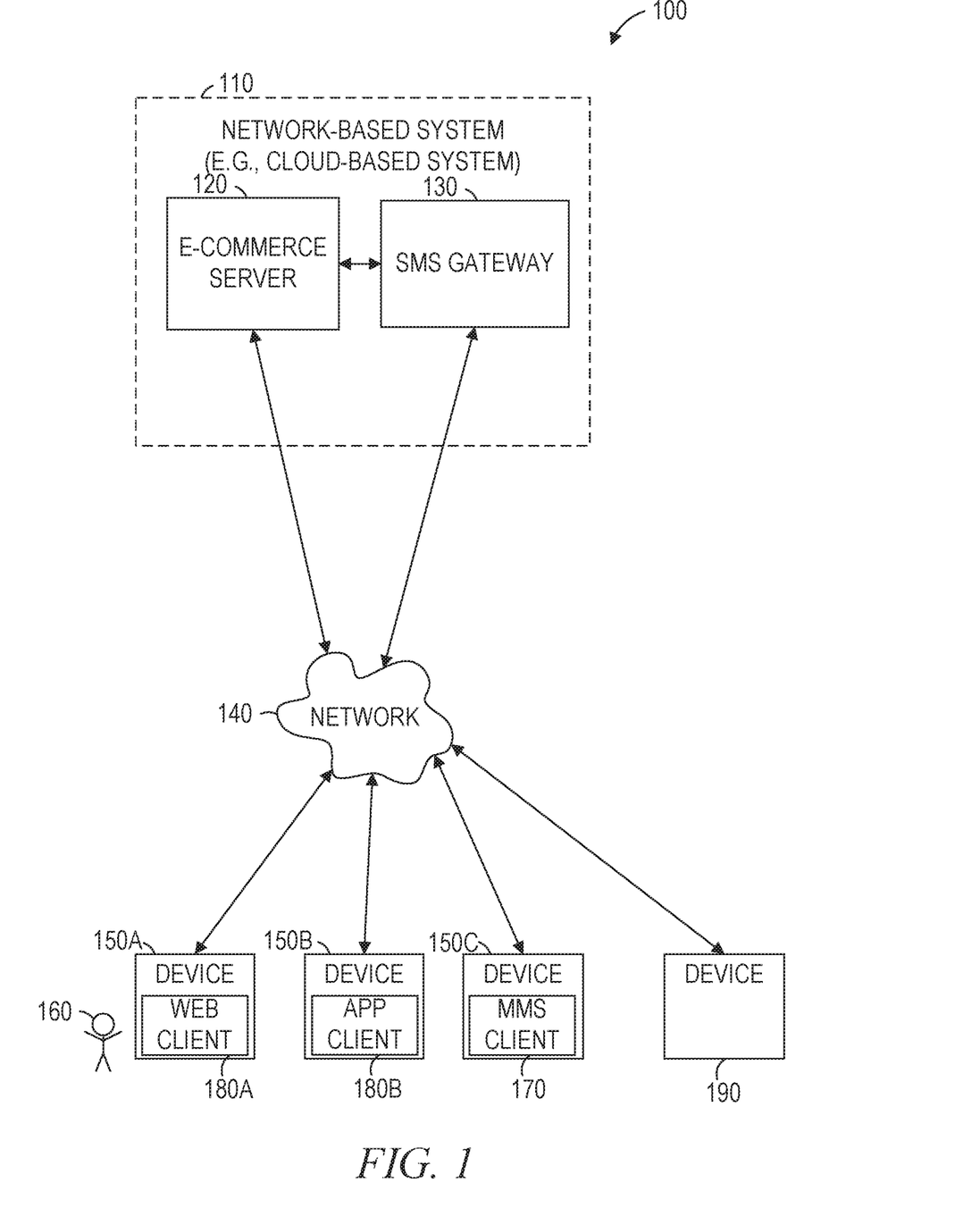
FIG. 1 is a network diagram illustrating a network environment suitable for adding images via MMS to a draft, according to some example embodiments.

FIG. 1 is a network diagram illustrating a network environment 100 suitable for adding images via MMS to a draft, according to some example embodiments. The network environment 100 includes an e-commerce server 120, an SMS gateway 130, and devices 150A, 150B, 150C, and 190 all communicatively coupled to each other via a network 140. The devices 150A, 150B, and 150C may be collectively referred to as "devices 150," or generically referred to as a "device 150." The e-commerce server 120 and the SMS gateway 130 may be part of a network-based system 110. The devices 150 may interact with the e-commerce server 120 using a web client 180A, an app client 180B, or an MMS client 170. The e-commerce server 120, the SMS gateway 130, the devices 150, and the device 190 may each be implemented in a computer system, in whole or in part, as described below with respect to FIGS. 8-9.

The e-commerce server 120 provides an electronic commerce application to other machines (e.g., the devices 150 and 190) via the network 140. The e-commerce server 120 may also be connected directly to, or integrated with, the SMS gateway 130. The electronic commerce application may provide a way for users to buy and sell items directly to each other, to buy from and sell to the electronic commerce application provider, or both.

The SMS gateway 130 provides a programmatic interface for sending and receiving SMS and MMS messages. The SMS gateway 130 may be used by the e-commerce server 120 to send an SMS message that requests an image and to receive an MMS message that includes an image.

Also shown in FIG. 1 is a user 160. The user 160 may be a human user (e.g., a human being), a machine user (e.g., a computer configured by a software program to interact with the devices 150 and the e-commerce server 120), or any suitable combination thereof (e.g., a human assisted by a machine or a machine supervised by a human). The user 160 is not part of the network environment 100, but is associated with the devices 150 and may be a user of the devices 150 (e.g., an owner of the devices 150A, 150B, and 150C). For example, the device 150 may be a sensor, a desktop computer, a vehicle computer, a tablet computer, a navigational device, a portable media device, or a smart phone belonging to the user 160. The device 190 may be associated with a different user.

In some example embodiments, the e-commerce server 120 receives a draft item listing from a user (e.g., the user 160). An item listing describes an item that can be purchased. For example, the user may create an item listing that describes an item owned by the user that may be purchased by another user via the e-commerce server 120. Item listings include text, one or more images, or both. The user may provide text for the draft item listing using the web client 180A of the device 150A or the app client 180B of the device 150B. The user may provide one or more images for the draft item listing using the MMS client 170 of the device 150C. The e-commerce server 120 may provide the completed item listing to other client devices, such as the device 190 associated with a different user.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 8-9. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

The network 140 may be any network that enables communication between or among machines, databases, and devices (e.g., the e-commerce server 120 and the devices 150). Accordingly, the network 140 may be a wired network, a wireless network (e.g., a mobile or cellular network), or any suitable combination thereof. The network 140 may include one or more portions that constitute a private network, a public network (e.g., the Internet), or any suitable combination thereof.

Figure 2:
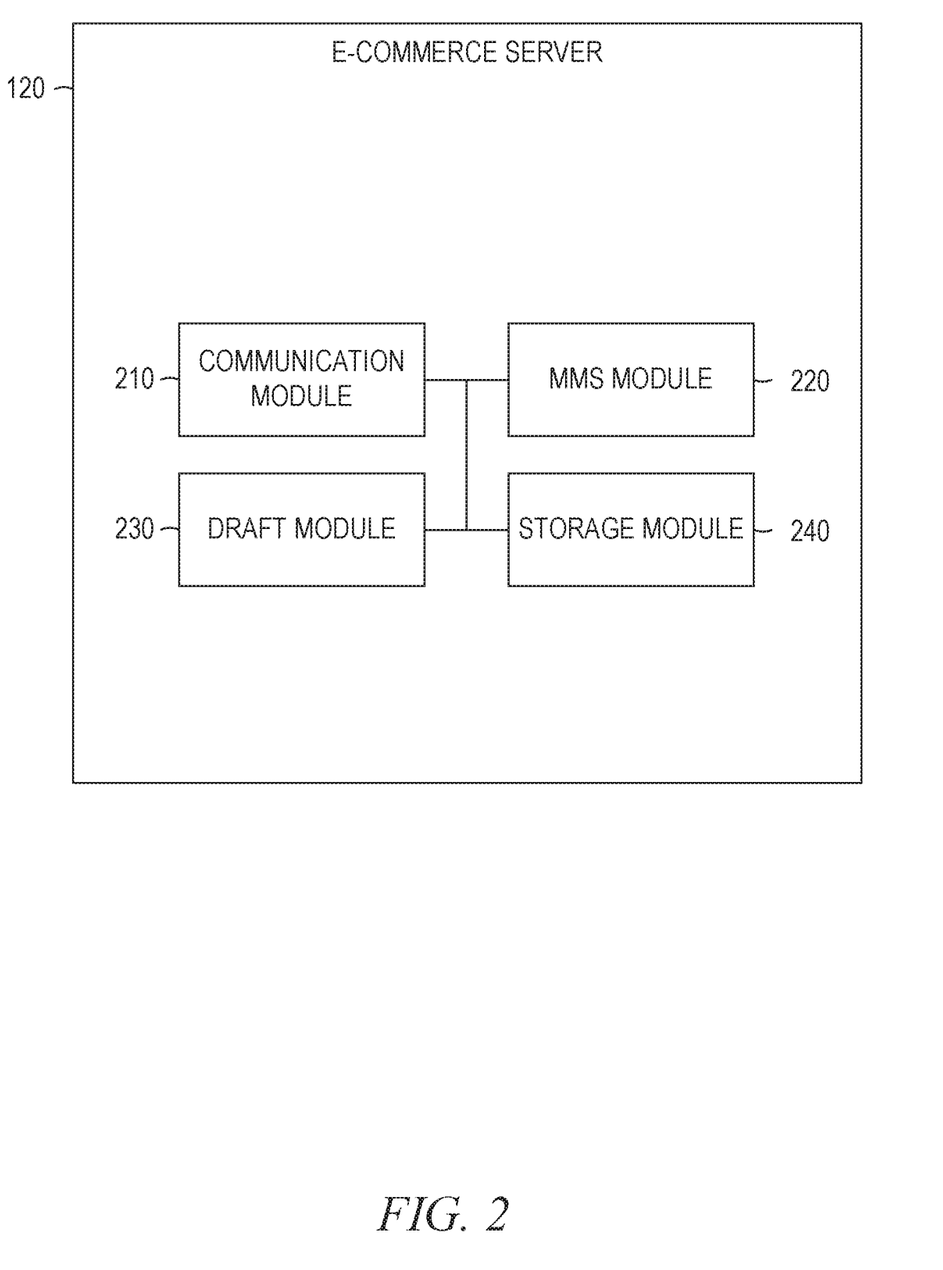
FIG. 2 is a block diagram illustrating components of an e-commerce server suitable for adding images via MMS to a draft, according to some example embodiments.

FIG. 2 is a block diagram illustrating components of the e-commerce server 120, according to some example embodiments. The e-commerce server 120 is shown as including a communication module 210, an MMS module 220, a draft module 230, and a storage module 240, all configured to communicate with each other (e.g., via a bus, shared memory, a switch, or application programming interfaces (APIs)). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 is configured to send and receive data. For example, the communication module 210 may receive text data over the network 140 and send the received data to the draft module 230.

The MMS module 220 is configured to send and receive SMS and MMS messages. For example, an SMS message may be sent to prompt a user of a mobile device (e.g., a mobile phone or a tablet computer) to send an image in response. An MMS message may be received from the mobile device that includes the image. The received image may be provided to the draft module 230 for inclusion in a draft.

The draft module 230 is configured to provide a user interface for receiving a draft document and to receive text for the draft document. For example, a user interface 300 (described below with respect to FIG. 3) may be presented by the draft module 230, and text may be received via an application interface or a web interface. The storage module 240 is configured to store data regarding draft and published documents.

Figure 3:
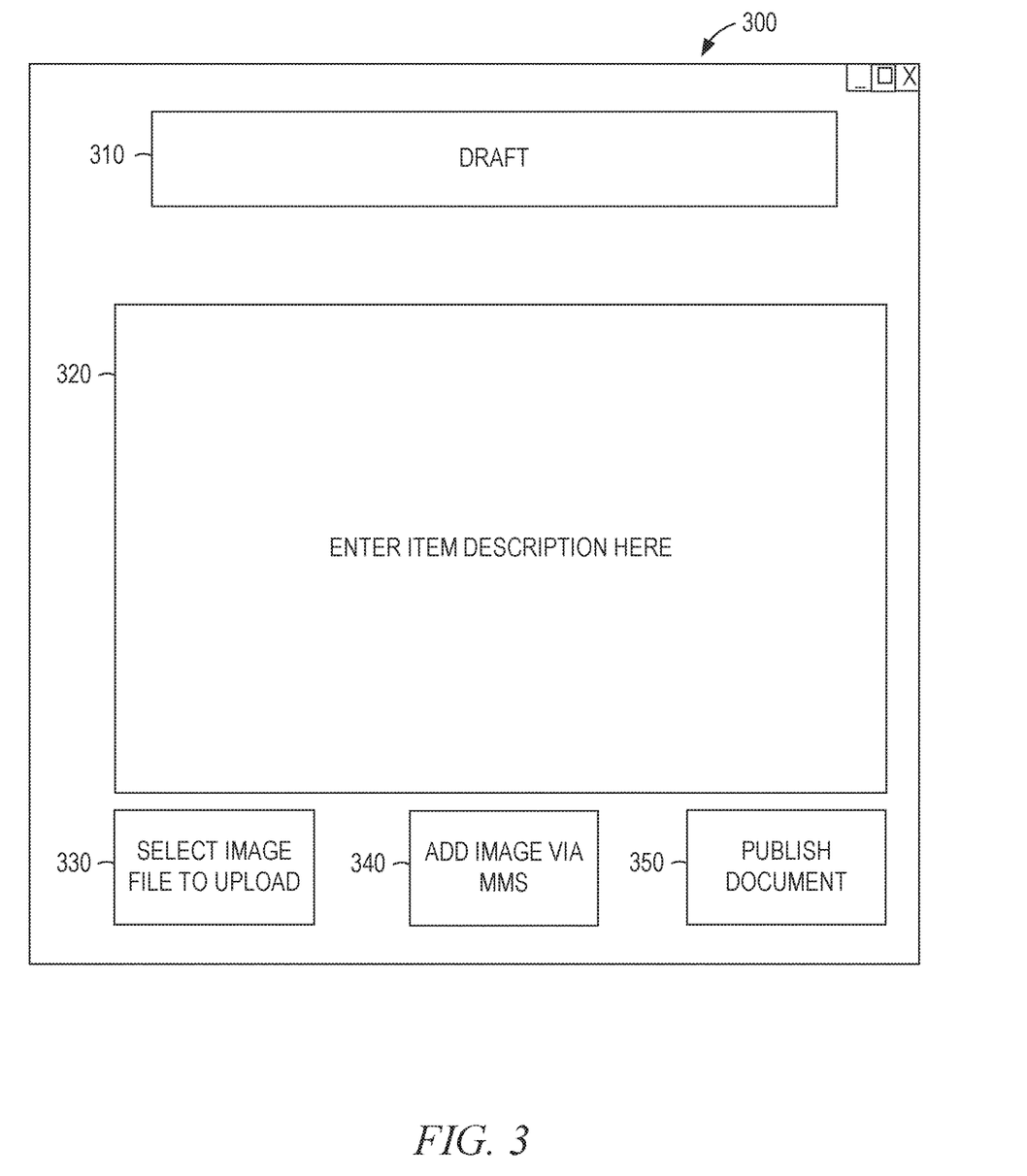
FIG. 3 is a block diagram illustrating a user interface suitable for editing a draft, according to some example embodiments.

FIG. 3 is a block diagram illustrating a user interface 300 suitable for editing a draft document, according to some example embodiments. As can be seen in FIG. 3, the user interface 300 includes a title 310 ("Draft"), a text area 320, and buttons 330, 340, and 350.

The user interface 300 may be displayed in response to a user creating a new document or accessing an existing document. The text area 320 displays text of the document (e.g., retrieved from a prior draft of the document, entered by the user into the text area 320, or any suitable combination thereof). The draft document may be an article for a web site, a description of an item for sale on an online marketplace, or a document used for another purpose. The button 330 is operable to select an image file to upload from the device on which the user interface 300 is displayed. For example, a file-picker interface may be presented to allow the user to select a file stored on a hard drive of the user's computer. The selected file may be uploaded to the e-commerce server 120 for inclusion in the draft.

The button 340 is operable to start a process by which one or more images are provided to the e-commerce server 120 from a device other than the device on which the user interface 300 is displayed. For example, the user may be prompted to enter a mobile phone number. The e-commerce server 120 causes a text message to be sent to the entered phone number. The user may respond to the text message with an MMS message that includes an image attachment. The e-commerce server 120 receives the MMS message and accesses the image, adding the image to the draft.

The button 350 is operable to publish the draft document. For example, draft documents may be accessible only to the author of the draft (e.g., as indicated in a draft table 550, discussed below with respect to FIG. 5), but published documents may be accessible by all users.

Figure 4:
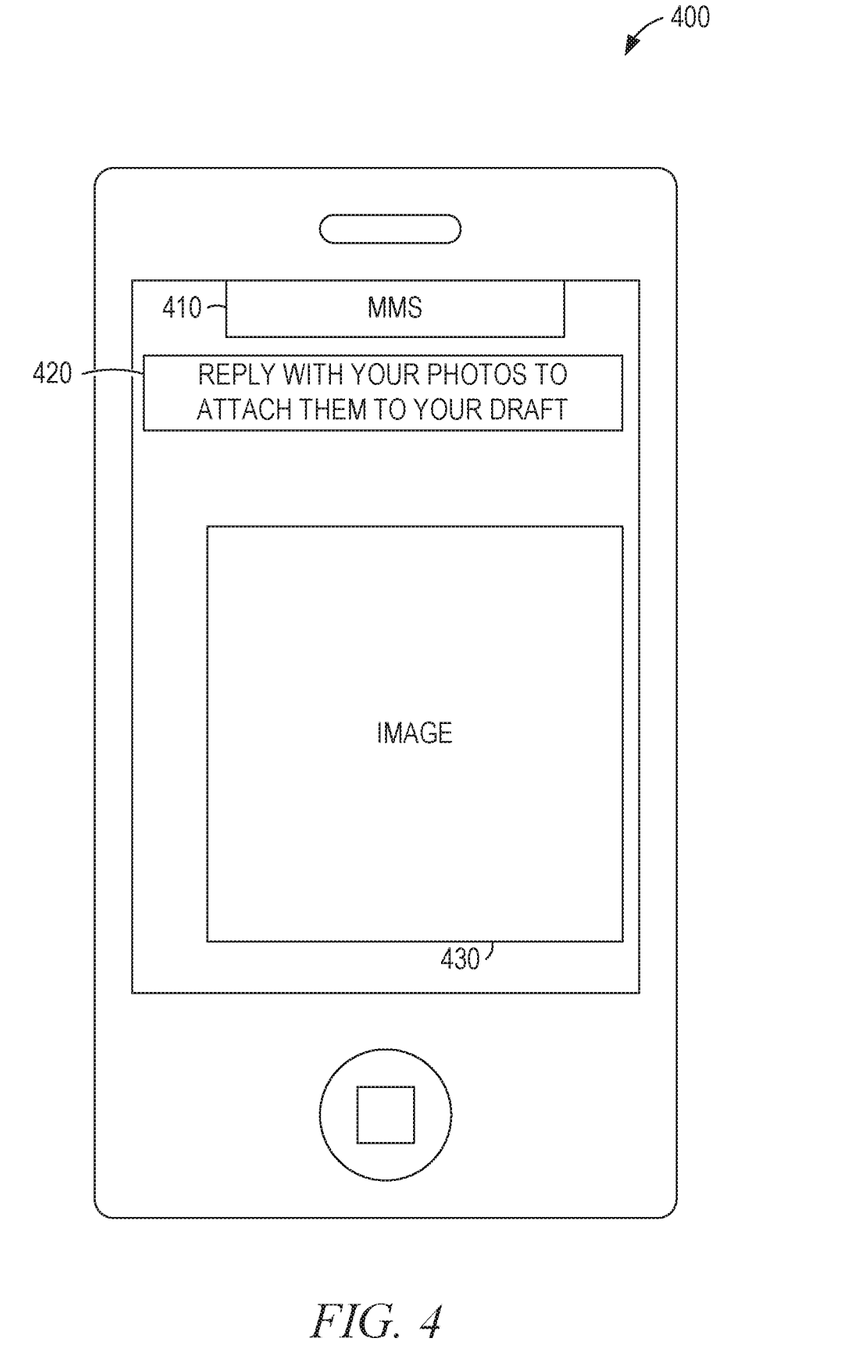
FIG. 4 is a block diagram illustrating a user interface suitable for adding images via MMS to a draft, according to some example embodiments.

FIG. 4 is a block diagram illustrating a user interface 400 suitable for adding images via MMS to a draft, according to some example embodiments. As can be seen in FIG. 4, the user interface 400 includes a title 410 ("MMS"), a received text message 420, and an outgoing MMS message 430. The user interface 400 may be shown on a screen of the device 1500 after the e-commerce server 120 detects a user interaction with a user interface element (e.g., after the user 160 operates the button 340 of the user interface 300).

The received text message 420 was received from the e-commerce server 120 and includes a prompt for the user. The user responds to the received text message 420 with the MMS message 430 that includes an image. The received text message 420 includes a return phone number (e.g., in header data), and the image is sent by the MMS client 170 to the return phone number. The received text message 420 may include an identifier of a document, an identifier of an item referred to by the document (e.g., an item being listed for sale on the e-commerce server 120), or another identifier. The identifier may be a title of the document (e.g., a title entered by the user, a title generated by the e-commerce server 120, or any suitable combination thereof) or another identifier (e.g., a unique identifier used in a database, such as in a draft identifier field 570 discussed below with respect to FIG. 5).

Figure 5:
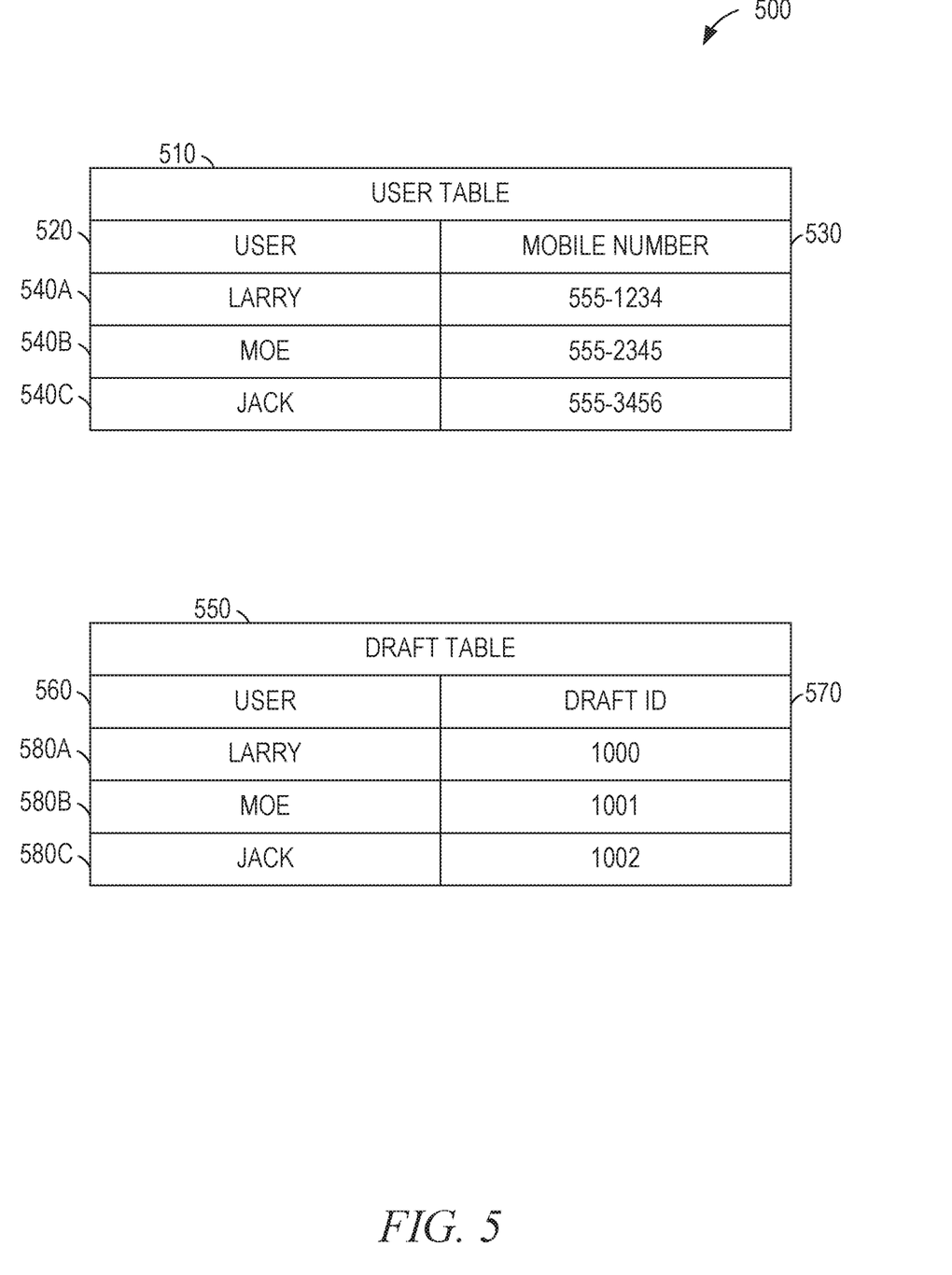
FIG. 5 is a block diagram illustrating a database schema suitable for adding images via MMS to a draft, according to some example embodiments.

FIG. 5 is a block diagram illustrating a database schema 500 suitable for adding images via MMS to a draft, according to some example embodiments. The database schema 500 includes a user table 510 and a draft table 550. The user table 510 includes a user field 520, a mobile number field 530, and rows 540A, 540B, and 540C. The draft table 550 includes a user field 560, a draft identifier (ID) field 570, and rows 580A, 580B, and 580C.

Each of the rows 540A-540C stores information for a user. The user field 520 stores a username or other unique identifier for each user. The mobile number field 530 stores a mobile phone number for each user. Thus, when the e-commerce server 120 requests an image via MMS from a user, the user table 510 may be used to identify the mobile phone number for the user, and the text message 420 of the user interface 400 may be sent to the identified mobile phone number.

Each of the rows 580A-580C stores information for a draft document. The user field 560 stores the username of the author of the draft. The draft ID field 570 stores a unique identifier for the draft. The draft table 550 may be used by the e-commerce server 120 for access control. For example, after authenticating a user (e.g., by verifying a password), the e-commerce server 120 may allow the user to select a draft for editing. The draft table 550 may also be used to associate received images (e.g., images received through the use of the user interface 400) with drafts. An image received from a mobile phone number associated with a user may be added to a draft associated with the same user. When multiple drafts are associated with the user, the received image may be added to the draft most recently edited by the user (e.g., as indicated in a timestamp field added to the draft table 550).

The user tables of FIG. 5 allow for identification of specific user accounts and their associated drafts, allowing provision to a desktop computer of only the images associated with a particular draft. This saves effort on the part of the desktop user, who would otherwise have to identify the correct image for each listing. Additionally, the database structure of FIG. 5 saves computing resources (both processor cycles and storage memory) by avoiding unnecessary downloading of images to the desktop computer and uploading of images from the desktop computer.

Figure 6:
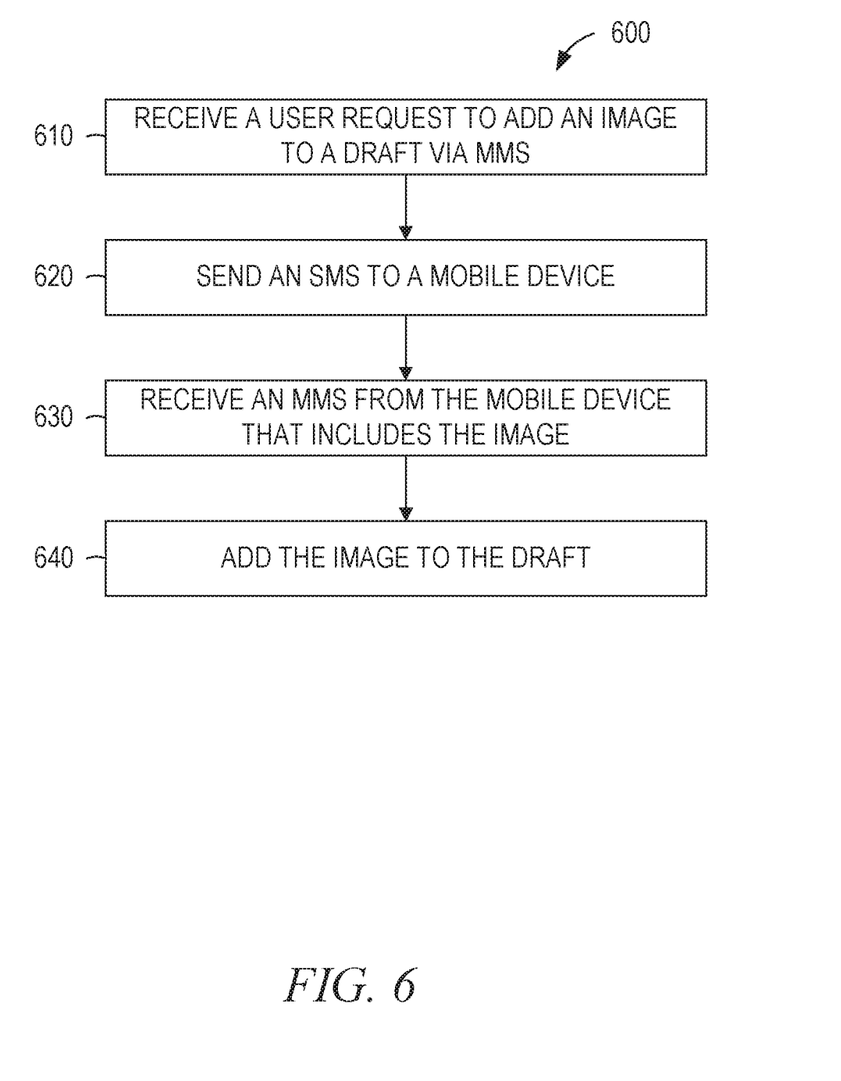
FIG. 6 is a flowchart illustrating operations of an e-commerce server in performing a method of adding images via MMS to a draft, according to some example embodiments.

FIG. 6 is a flowchart illustrating operations of an e-commerce server in performing a method 600 of adding images via MMS to a draft, according to some example embodiments. Operations in the method 600 may be performed by the e-commerce server 120, using modules described above with respect to FIG. 2.

In operation 610, the draft module 230 receives a user request to add an image to a draft via MMS. For example, the button 340 of the user interface 300 may be pressed, clicked, or touched to indicate that the user wishes to add an image to a draft. In some example embodiments, the user request includes an identifier of a user account on an online marketplace (e.g., a value corresponding to the user field 520 of the user table 510 of FIG. 5).

In operation 620, the MMS module 220 sends an SMS or other text message to a mobile device. In some example embodiments, the MMS module 220 retrieves a phone number for the mobile device from the user table 510 of the database schema 500. In response to receiving the SMS message, the mobile device (e.g., the device 150C) may display the user interface 400. The MMS module 220 may send the text message via the SMS gateway 130.

In operation 630, the MMS module 220 receives an MMS message from the mobile device that includes the image to be added to the draft. In some example embodiments, the MMS module 220 receives the MMS message via the SMS gateway 130. The draft module 230, in operation 640, adds the received image to the draft. For example, the received image may be stored by the storage module 240 and an image field of the draft table 550 may be updated to indicate that the stored image is part of the draft. As another example, a file storing the draft may be modified to include the image itself or a reference to the stored image.

Figure 7:
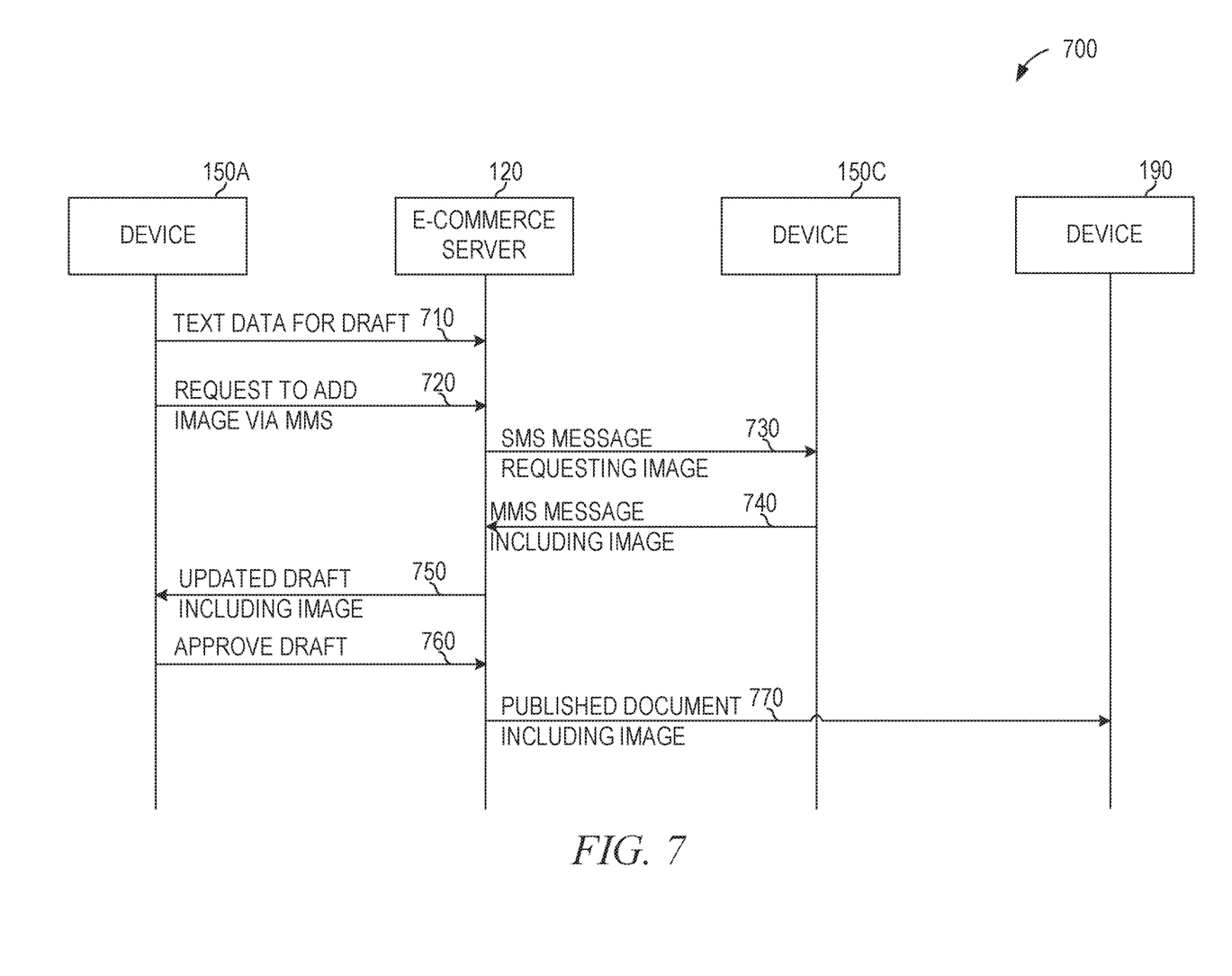
FIG. 7 is a communication chart illustration that illustrates communications of servers and devices in performing a method of adding images via MMS to a draft, according to some example embodiments.

FIG. 7 is a communication chart illustration 700 that illustrates communications of servers and devices in performing a method of adding images via MINIS to a draft, according to some example embodiments. The communication chart illustration 700 includes communications 710, 720, 730, 740, 750, 760, and 770 among the e-commerce server 120 and the devices 150A, 150C, and 190.

In the communication 710, the device 150A (e.g., a laptop or desktop computer) sends text data for a draft to the e-commerce server 120. For example, a user may enter text into the text area 320 of the user interface 300 displayed in a web browser implementation of the web client 180A. In response to receiving the text from the user, the web client 180A may send the text via HTTP to the e-commerce server 120 via the network 140 (e.g., the Internet).

The device 150A sends a request to add an image via MMS to the e-commerce server 120, in the communication 720. For example, the user may interact with the button 340 of the user interface 300.

In response to receiving the request to add the image, the e-commerce server 120 sends an SMS message requesting the image to the device 150C (e.g., a mobile phone or tablet), in the communication 730. The device 150C responds to the SMS message with an MMS message that includes the image, in the communication 740. In some example embodiments, the user provides the image using the user interface 400. The e-commerce server 120 may incorporate the received image into an electronic publication (e.g., a weblog, a news site, or an online catalog).

After receiving the image, the e-commerce server 120 updates the draft and sends, in the communication 750, the updated draft including the image to the device 150A. The updated draft may be displayed on a screen of the device 150A (e.g., in an updated version of the user interface 300 that includes the image).

In the communication 760, the device 150A approves the draft for publication by the e-commerce server 120. For example, the user may operate the button 350 of the user interface 300 and the web client 180A may send an instruction to publish the draft via HTTP.

The e-commerce server 120 sends, in the communication 770, the published document including the image to the device 190. For example, another user may browse documents published by the e-commerce server 120 and receive the published document.

According to various example embodiments, one or more of the methodologies described herein may facilitate adding images to documents via MMS. Hence, one or more of the methodologies described herein may facilitate adding an image to a document without requiring the user to first transfer the image from an image-capturing device to a document-editing device.

When these effects are considered in aggregate, one or more of the methodologies described herein may obviate a need for certain efforts or resources that otherwise would be involved in adding images to documents. Efforts expended by a user in transferring images may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Modules, Components, and Logic

Certain embodiments are described herein as including logic or a number of components, modules, or mechanisms. Modules may constitute either software modules (e.g., code embodied on a non-transitory machine-readable medium) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application programming interfaces (APIs)).

Electronic Apparatus and System

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special-purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Software Architecture

Figure 8:
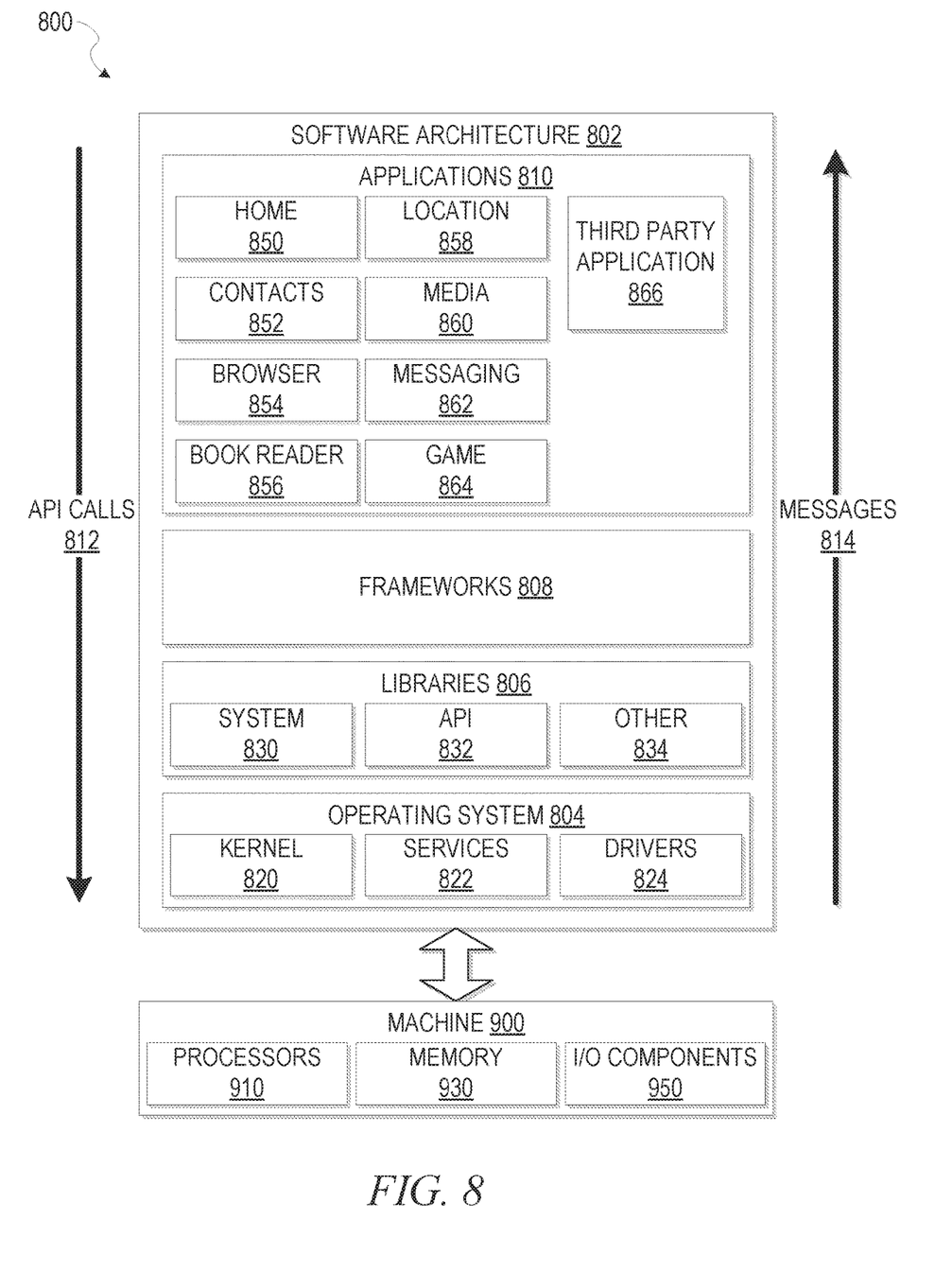
FIG. 8 is a block diagram illustrating an example of a software architecture that may be installed on a machine, according to some example embodiments.

FIG. 8 is a block diagram 800 illustrating a software architecture 802, which may be installed on any one or more of the devices described above. FIG. 8 is merely a non-limiting example of a software architecture, and it will be appreciated that many other architectures may be implemented to facilitate the functionality described herein. The software architecture 802 may be implemented by hardware such as a machine 900 of FIG. 9 that includes processors 910, memory 930, and I/O components 950. In this example, the software architecture 802 may be conceptualized as a stack of layers where each layer may provide a particular functionality. For example, the software architecture 802 includes layers such as an operating system 804, libraries 806, frameworks 808, and applications 810. Operationally, the applications 810 invoke application programming interface (API) calls 812 through the software stack and receive messages 814 in response to the API calls 812, according to some implementations.

In various implementations, the operating system 804 manages hardware resources and provides common services. The operating system 804 includes, for example, a kernel 820, services 822, and drivers 824. The kernel 820 acts as an abstraction layer between the hardware and the other software layers in some implementations. For example, the kernel 820 provides memory management, processor management (e.g., scheduling), component management, networking, and security settings, among other functionality. The services 822 may provide other common services for the other software layers. The drivers 824 may be responsible for controlling or interfacing with the underlying hardware. For instance, the drivers 824 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 806 provide a low-level common infrastructure that may be utilized by the applications 810. The libraries 806 may include system libraries 830 (e.g., C standard library) that may provide functions such as memory allocation functions, string manipulation functions, mathematic functions, and the like. In addition, the libraries 806 may include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 may also include a wide variety of other libraries 834 to provide many other APIs to the applications 810.

The frameworks 808 provide a high-level common infrastructure that may be utilized by the applications 810, according to some implementations. For example, the frameworks 808 provide various graphic user interface (GUI) functions, high-level resource management, high-level location services, and so forth. The frameworks 808 may provide a broad spectrum of other APIs that may be utilized by the applications 810, some of which may be specific to a particular operating system or platform.

In an example embodiment, the applications 810 include a home application 850, a contacts application 852, a browser application 854, a book reader application 856, a location application 858, a media application 860, a messaging application 862, a game application 864, and a broad assortment of other applications such as a third-party application 866. According to some embodiments, the applications 810 are programs that execute functions defined in the programs. Various programming languages may be employed to create one or more of the applications 810, structured in a variety of manners, such as object-orientated programming languages (e.g., Objective-C, Java, or C++) or procedural programming languages (e.g., C or assembly language). In a specific example, the third-party application 866 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 866 may invoke the API calls 812 provided by the mobile operating system (e.g., the operating system 804) to facilitate functionality described herein.

Example Machine Architecture and Machine-Readable Medium

Figure 9:
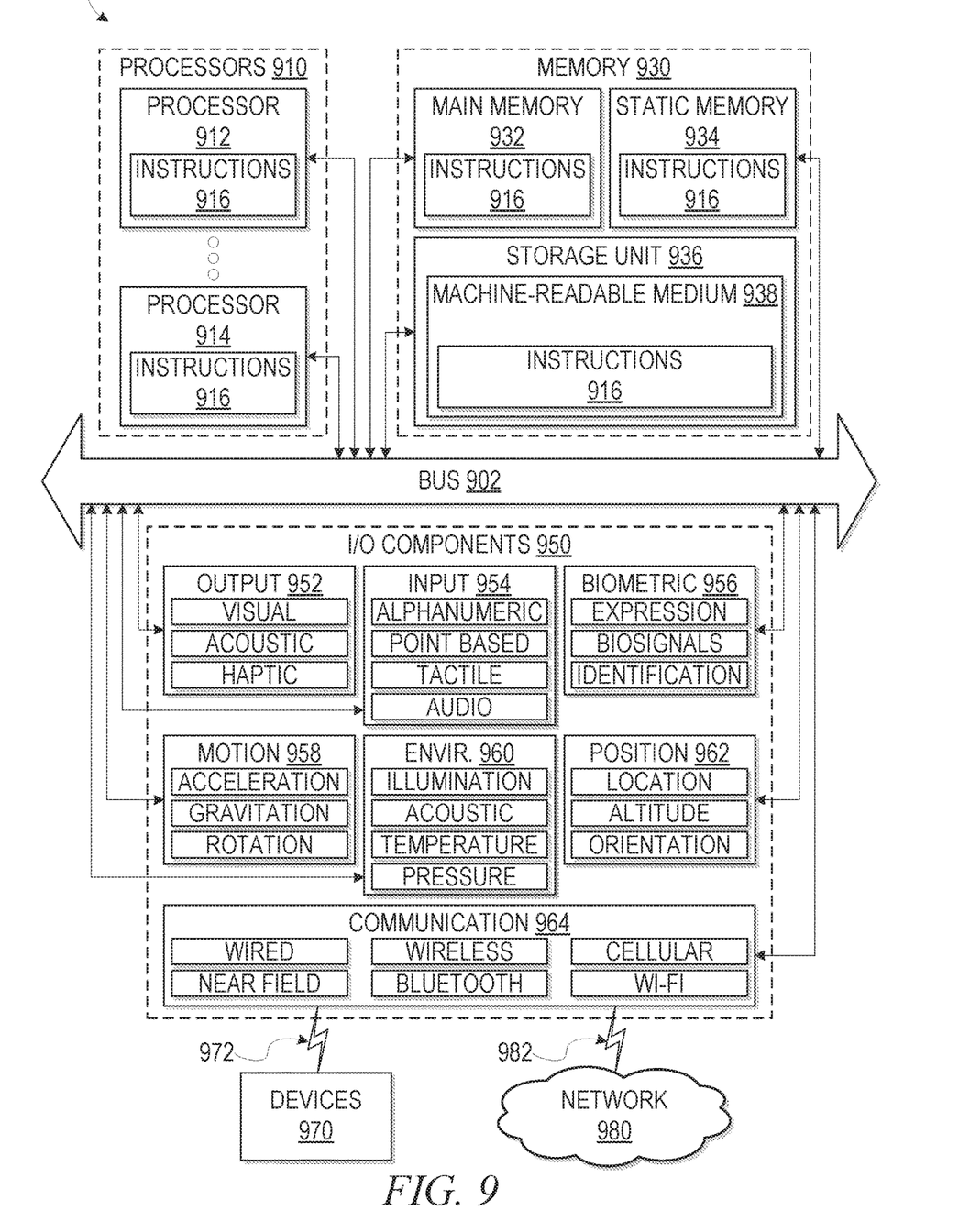
FIG. 9 is a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an apples, an app, or other executable code) for causing the machine 900 to perform any one or more of the methodologies discussed herein may be executed. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (also referred to as "cores") that may execute instructions contemporaneously. Although FIG. 9 shows multiple processors, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936 accessible to the processors 910 via the bus 902. The storage unit 9:36 may include a machine-readable medium 938 on which are stored the instructions 916 embodying any one or more of the methodologies or functions described herein. The instructions 916 may also reside, completely or at least partially, within the main memory 932, within the static memory 934, within at least one of the processors 910 (e.g., within the processor's cache memory), or any suitable combination thereof, during execution thereof by the machine 900. Accordingly, in various implementations, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown in an example embodiment to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine processors 910), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 950 include biometric components 956, motion components 958, environmental components 960, or position components 962, among a wide array of other components. For example, the biometric components 956 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 include acceleration sensor components (e.g., accelerometer), gravitation sensor components, rotation sensor components gyroscope), and so forth. The environmental components 960 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, the communication components 964 include wired communication components, wireless communication components, cellular communication components, Near Field Communication (NFC) components, Bluetooth™ components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, in some implementations, the communication components 964 detect identifiers or include components operable to detect identifiers. For example, the communication components 964 include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 964, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UNITS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other example embodiments, the instructions 916 are transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Furthermore, the machine-readable medium 938 is non-transitory (in other words, not having any transitory signals) in that it does not embody a propagating signal. However, labeling the machine-readable medium 938 as "non-transitory" should not be construed to mean that the medium is incapable of movement; the medium should be considered as being transportable from one physical location to another. Additionally, since the machine-readable medium 938 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    receiving, by one or more processors, data from a first device associated with a user, the data being for a draft document;
    receiving, from the first device, a user request;
    in response to the user request, sending a text message to a mobile device associated with the user, the mobile device being separate from the first device;
    after sending the text message to the mobile device, receiving from the mobile device a multimedia messaging service (MMS) message that includes an image;
    adding the received image to the draft document; and
    causing presentation of the data and the received image at the first device associated with the user.

2. The method of claim 1, wherein the adding of the received image to the draft document comprises modifying a file.

3. The method of claim 1, wherein the adding of the received image to the draft document comprises modifying a table in a database.

4. The method of claim 1, wherein the receiving of the user request comprises detecting a user interaction with a user interface element.

5. The method of claim 1, wherein the data received from the first device is a description of an item for sale on an online marketplace.

6. The method of claim 5, wherein the text message includes an identifier of the item.

7. The method of claim 5, wherein the user request includes an identifier of a user account on the online marketplace.

8. The method of claim 5, wherein the user request includes an identifier of the item.

9. The method of claim 1, further comprising incorporating the received image into an electronic publication.

10. The method of claim 1, wherein the first device and the mobile device are both owned by the user.

11. A system comprising:
    a memory that stores instructions; and
    one or more processors configured by the instructions to perform operations comprising:
        receiving data from a first device associated with a user, the data being for a draft document;
        receiving, from the first device, a user request;
        in response to the user request, sending a text message to a mobile device associated with the user, the mobile device being separate from the first device;
        after sending the text message to the mobile device, receiving from the mobile device a multimedia messaging service (MMS) message that includes an image;
        adding the received image to the draft document; and
        causing presentation of the data and the received image at the first device associated with the user.

12. The system of claim 11, wherein the adding of the received image to the draft document comprises modifying a file.

13. The system of claim 11, wherein the adding of the received image to the draft document comprises modifying a table in a database.

14. The system of claim 11, wherein the receiving of the user request comprises detecting a user interaction with a user interface element.

15. The system of claim 11, wherein the data received from the first device is a description of an item for sale on an online marketplace.

16. The system of claim 15, wherein the text message includes an identifier of the item.

17. The system of claim 15, wherein the user request includes an identifier of a user account on the online marketplace.

18. The system of claim 15, wherein the user request includes an identifier of the item.

19. The system of claim 1, wherein the operations further comprise: incorporating the received image into an electronic publication.

20. A non-transitory machine-readable medium comprising instructions that, when executed by one or more processors of a machine, cause the machine to perform operations comprising:
    receiving data from a first device associated with a user, the data being for a draft document:
    receiving, from the first device, a user request;
    in response to the user request, sending a text message to a mobile device associated with the user, the mobile device being separate from the first device;
    after sending the text message to the mobile device, receiving from the mobile device a multimedia messaging service (MMS) message that includes an image;
    adding the received image to the draft document; and
    causing presentation of the data and the received image at the first device associated with the user.

* * * * *